United States Patent [19]

Katsimbas

[11] 3,963,686

[45] June 15, 1976

[54] HEAT-CURABLE PULVERULENT COATING AGENT CONSISTING OF A MIXTURE OF COMPOUNDS CONTAINING GLYCIDYL GROUPS, DICARBOXYLIC ACID ANHYDRIDES, CURING ACCELERATORS, FLOW CONTROL AGENTS AND OPTIONALLY FURTHER CUSTOMARY ADDITIVES

[75] Inventor: Themistoklis Katsimbas, Hamburg, Germany

[73] Assignee: Hoechst Aktiengesellschaft, Germany

[22] Filed: May 30, 1974

[21] Appl. No.: 474,532

[30] Foreign Application Priority Data

June 26, 1973  Switzerland.......................... 9315/73

[52] U.S. Cl. ............................. 260/837 R; 260/42; 260/830 R; 260/830 TW; 260/836; 427/27; 427/195

[51] Int. Cl.² ......................................... C08G 45/04

[58] Field of Search ............ 260/836, 837, 830 TW, 260/830 R, 47 EA, 78.4 EP; 427/195

[56] References Cited

UNITED STATES PATENTS

| | | | |
|---|---|---|---|
| 3,269,974 | 8/1966 | Childs | 260/830 TW |
| 3,388,185 | 6/1968 | Goldberg | 260/47 EA |
| 3,400,098 | 9/1968 | Parry | 260/47 EA |
| 3,409,592 | 11/1968 | Landua | 260/837 |
| 3,647,726 | 3/1972 | Ulmer | 260/837 |
| 3,661,828 | 5/1972 | Fellers | 260/830 TW |
| 3,758,633 | 9/1973 | Labana | 260/830 TW |
| 3,842,035 | 10/1974 | Klaren | 260/47 EA |

*Primary Examiner*—Murray Tillman
*Assistant Examiner*—T. Pertilla
*Attorney, Agent, or Firm*—Gordon W. Hueschen

[57] ABSTRACT

The invention relates to heat-curable pulverulent coating agents, frequently also called power lacquers, which are suitable for applying a coherent coating which possesses excellent properties after heat-curing.

1 Claim, No Drawings

HEAT-CURABLE PULVERULENT COATING AGENT CONSISTING OF A MIXTURE OF COMPOUNDS CONTAINING GLYCIDYL GROUPS, DICARBOXYLIC ACID ANHYDRIDES, CURING ACCELERATORS, FLOW CONTROL AGENTS AND OPTIONALLY FURTHER CUSTOMARY ADDITIVES

BACKGROUND OF THE INVENTION

It is already known to manufacture heat-curable pulverulent coating agents based on compounds which contain glycidyl groups, and to use such coating agents. However, such known products suffer from the disadvantage that they tend to yellow under the influence of irradiation by light, sunlight and UV and in addition the weathering resistance and at times also the adhesion of the applied coating leaves something to be desired. Some of the products known tend to form blisters and craters, especially when fairly thick layers of the coating agent have to be applied.

1. It is the task of the present invention to provide a heat-curable pulverulent coating agent which shows simultaneous improvements in various directions compared to the known pulverulent coating agents. One objective is that it should be possible to manufacture the pulverulent coating agents by simple mixing, homogenising fusion and conjoint grinding of the requisite components.
2. The pulverulent coating agent manufactured by thorough mixing, homogenising fusion and grinding should be storage-stable at the customary storage temperatures between about −40° and +50°C.
3. The coating agent should, after application, give very glossy coatings of good levelling characteristics and freedom from blisters and craters, merely by stoving for about 15 to 30 minutes at about 150° to 180°C.
4. The stoved films should not yellow and should exhibit improved weathering resistance.

SUMMARY

The subject of the invention is a pulverulent coating agent of a mixture of:

A. a compound which contains glycidyl groups,
B. at least one dicarboxylic acid anhydride in an amount corresponding to 0.4 − 1.0 anhydride groups per epoxy group (glycidyl group) of the component (A),
C. a curing accelerator in the form of an organic base and optionally
D. a flow control agent in an amount of at least 0.05 per cent by weight of the mixture, which agent is a polymer of molecular weight ($\overline{M}_n$) of at least 1,000 and has a glass transition temperature which is at least 50°C lower than the glass transition temperature of the component (A), characterised in that the component (A) consists of 84 to 94 per cent by weight of polyepoxides which have Durran softening points of about 90° − 110°C and are soluble in organic solvents, and have the general formula

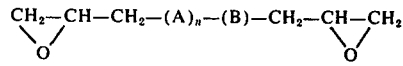

wherein:
if A is (—OOC—$R_1$—COO—$CH_2$—CHOH—$CH_2$—) then B represents (—OOC—$R_1$—COO—),
wherein $R_1$ represents an aliphatic or aromatic hydro 2 radical and $n$ is zero or a small number from zero to eight; or
if A is (—O—$R_1$—O—$CH_2$—CHOH—$CH_2$—),
then B denotes (—O—$R_1$—O—) and $R_1$ has the meaning already mentioned, or
if A represents

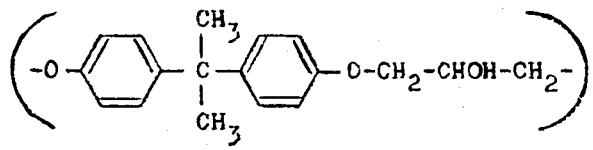

then B is

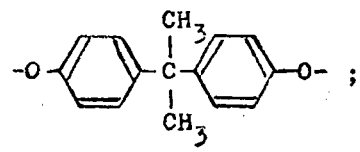

the component (B) consisting of 6–16 per cent by weight of at least one dicarboxylic acid anhydride with melting points of about 60°–140°C,
the component (C) consisting of 0.5–1.8 per cent by weight of N′,N′-bis-(dimethylaminoisobutylidene)-melamine and the optional component (D) consisting of a flow control agent and other customary additives.

Suitable polyepoxides, which have Durran softening points of about 90° − 110°C and are soluble in organic solvents, are polyesters with epoxide groups such as are obtainable by reaction of a dicarboxylic acid with epihalogenohydrin or dihalogenohydrin, such as, for example, epichlorohydrin, dichlorohydrin or the like, in the presence of alkali. Such polyesters can be derived from aliphatic dicarboxylic acids, such as oxalic acid, succinic acid, glutaric acid, adipic acid, pimelic acid, suberic acid, azelaic acid and sebacic acid, or from aromatic dicarboxylic acids, such as phthalic acid, isophthalic acid, terephthalic acid, 2,6-naphthylenedicarboxylic acid, diphenyl-o,o′-dicarboxylic acid and ethylene glycol bis-(p-carboxylphenyl)-ether, these being employed individually or as mixtures.

The polyepoxides correspond essentially to the formula

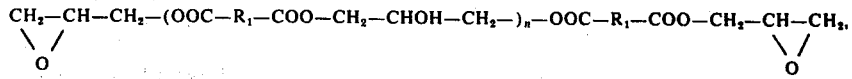

wherein $R_1$ represents an aliphatic or aromatic hydrogen carbon radical and $n$ is zero or denotes a small number from zero to eight. Compounds of the said formula of which the molecular weight does not exceed 3,000 are very suitable. Compounds of molecular weight between 300 and 750 are preferred.

The most suitable compounds are polyethers with epoxide groups, such as are obtained by etherification of a dihydric alcohol or diphenol with epihalogenohydrins or dihalogenohydrins, for example with epichlorohydrin or dichlorohydrin, in the presence of alkali. These compounds can be derived from glycols, such as ethylene glycol, diethylene glycol, triethylene glycol, 1,2-propylene glycol, 1,3-propylene glycol, 1,4-butylene glycol, 1,5-pentanediol and 1,6-hexanediol and especially from diphenols, such as resorcinol, pyrocatechol, hydroquinone, 1,4-dihydroxynaphthalene, bis-(4-hydroxyphenyl)-methane, bis-(4-hydroxyphenyl)-methylphenylmethane, bis-(4-hydroxyphenyl)-tolylmethane, 4,4'-dihydroxydiphenyl and 2,2-bis-(4-hydroxyphenyl)-propane.

The polyethers containing epoxide groups have the general formula

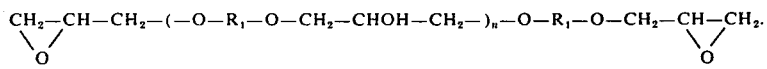

Herein, $R_1$ denotes an aliphatic or aromatic hydrogen carbon radical and $n$ denotes zero or a small number from zero to eight.

Compounds to be singled out very particularly are polyethers containing epoxide groups, of the general formula

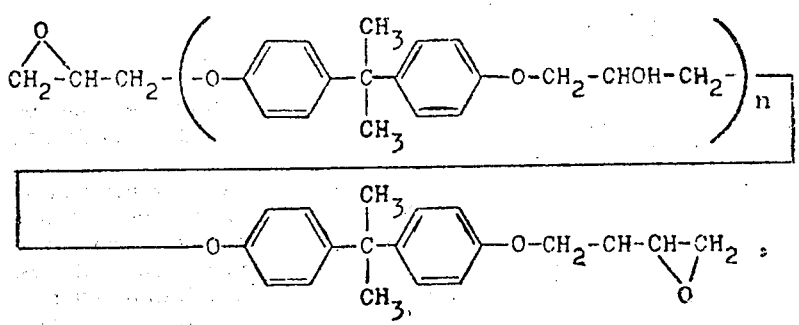

which contain 2,2-bis-(4-hydroxyphenyl)-propane as the starting compound, and amongst these, in turn, polyethers with an epoxide equivalent weight of less than 1,500, preferably 400 to 1,200, are used preferentially. The best results are obtained using epoxy resins of the above-mentioned kind, which have an epoxy equivalent weight of 850 to 1,000.

As dicarboxylic acid anhydrides (component B) it is possible to use phthalic anhydride, p-chlorophthalic anhydride, tetrabromophthalic anhydride, cyclohexane-1,2-dicarboxylic acid anhydride, 4-methylhexane-1,2-dicarboxylic acid anhydride, cyclopentane-1,2-dicarboxylic acid anhydride, dodecylsuccinic anhydride, succinic anhydride, maleic anhydride, methylsuccinic anhydride and polyazelaic anhydride. In general, anhydrides having a melting point in the range of 60° to 140°C are preferred.

N',N'-bis-(Dimethylaminoisobutylidene)-melamine is used as component (C). The manufacture of this compound is described in German Offenlegungsschrift No. 1,620,178, on page 5, in Example 1. Further, this compound has been described by the same applicant, in German Offenlegungsschrift No. 1,645,190, as a curing agent for epoxide resins. According to this prior description, this curing agent is used together with epoxide compounds, in amounts of 2 to 25 per cent by weight, preferably 2 to 10 per cent by weight, relative to the amount of the epoxide compound, for the purpose of a curing agent. However, it was not known, and also not to be expected, that this known curing agent would, when used in amounts of less than 2 per cent by weight, together with dicarboxylic acid anhydrides, exert an accelerating action on the anhydride curing of the epoxide resins.

As the flow control agent, it is possible to use, in the pulverulent coating agent, an acrylic polymer having a glass transition temperature which is at least 50°C lower than the glass transition temperature of the copolymer used in the mixture. Preferred acrylic polymers which can be used as flow control agents are polylauryl acrylate, polybutyl acrylate, poly-(2-ethylhexyl acrylate), polylauryl methacrylate and polyisodecyl methacrylate.

The flow control agent can also be a fluorinated polymer which at the stoving temperature of the powder mixture has a lower surface tension than has the copolymer used in the mixture. If a fluorinated polymer is used as the flow control agent, esters of polyethylene glycol or polypropylene glycol and fluorinated fatty acids are preferred. An example of a suitable flow control agent is an ester of polyethylene glycol, of molecular weight greater than 2,500 but not greater than 20,000, and perfluorooctanoic acid.

It is also possible to add pigments, levelling agents and other additives customary to such coating agents.

The solvent-free, optionally pigmented components, which are brittle in the non-crosslinked state, are ground to a particle size of about 100 to 300µ, fused at about 95°–110°C with good mixing or kneading, cooled, again ground, after solidification, to a particle size of 30 to 120µ, and optionally screened according to particle size.

The pulverulent coating agents to be used according to the invention are still free-flowing at temperatures of at least 40°C, preferably 45°C, have flow temperatures of approx. 80° to 120°C and are stoved at temperatures above 130°C, preferably at 160° to 180°C, whereupon crosslinking occurs.

The pulverulent coating agents are supplied to suitable substrates, especially metals, in accordance with known methods, for example the electrostatic powder spraying process.

The stoved films of the pulverulent coating agents used according to the invention have excellent adhesion and hardness coupled with elasticity. Furthermore, they are distinguished by high gloss, good weathering resistance and very good resistance to wash liquors.

The powders are used for coating household utensils, metal parts used in car manufacture, metal parts which are exposed to weathering factors, such as facade panels, pipes, wire braids, equipment used in forestry and agriculture and other metal articles for interior architecture.

The examples which follow describe the manufacture of the powders and their use as electrostatically sprayable powders. The parts and percentages quoted in the examples are by weight, unless stated otherwise.

EXAMPLE 1

300 g of epoxide resin based on bisphenol A and epichlorohydrin, having an epoxide equivalent of 800 to 1,100, and a Durran softening point of 94° to 104°C, are mixed, and ground, with 30 g of a curing agent mixture which consists of 92 per cent by weight of tetrahydrophthalic anhydride and 8 per cent by weight of N′,N′-bis-(dimethylaminoisobutylidene)-malamine and with 130 g of very finely divided pure white titanium dioxide of the rutile type (manufactured by the chloride process) and 1.2 g of Modaflow [poly(2-ethylhexylacrylate)]. The powder is then mixed for 4 minutes in an extruder at 100°C and the melt is chilled to room temperature and ground to give particles of size approx. 90 μ. The resin is applied by means of an electro-spray gun onto degreased metal sheets and then stoved for 30 minutes at 160°C.

Coatings having the properties shown below are obtained; they were examined in comparison with a commercially available power coating based on the same epoxide resin and a curing accelerator mixture based on dicyandiamide-imidazole compounds. The results of the comparison are summarized in Table 1 below:

|  | Powder according to Example 1 | Commercial product for comparison |
|---|---|---|
| Coating thickness, μ | 48–54 | 46–54 |
| Levelling, assessed visually | 0–1 | 3–4 |
| Holding test | 0 | 0 |
| Yellowing | 1 | 3 |
| Erichsen deep-drawing value | 6.7 mm | 6.8 mm |
| Pencil hardness | H5 | H4 |
| Gloss by Lange's method | 98 | 82 |

Note: 0 means "very good" and 5 means "bad"

EXAMPLE 2

The procedure followed is as in Example 1 but as a modification a mixture of 60 parts by weight of phthalic anhydride and 40 parts by weight of succinic anhydride is used instead of tetrahydrophthalic anhydride.

After elastrostatic applicaton and heat-curing, coatings of high gloss and uniform levelling result. The coatings can no longer be dissolved in xylene.

EXAMPLE 3

The procedure of Example 1 is followed, but instead of tetrahydrophthalic anhydride a mixture of 98 parts by weight of phthalic anhydride and 2 parts by weight of maleic anhydride is employed. The electrostatically applied coatings which have been stoved at 160°C for 20 minutes are free from blisters and from yellowing. The resistance to wash liquor, in a 1% strength boiling solution of a domestic washing powder, is more than 120 hours.

EXAMPLE 4

The procedure in Example 1 is followed, but instead of tetrahydrophthalic anhydride polyazelaic anhydride is used. The electrostatically applied coatings which have been stoved at 180°C for 30 minutes are free from yellowing and show good weathering resistance, and exhibit higher values of the flexibility.

What is claimed is:

1. Pulverulent coating agent of a mixture of
   A. a component which consists of 84 to 94 percent by weight of polyepoxides which have Durran softening points of about 90°–110°C and are soluble in organic solvents, and have the general formula

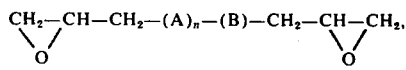

wherein
   if A is (—OOC—$R_1$—COO—$CH_2$—CHOH—$CH_2$—)
   then B represents (—OOC—$R_1$—COO),
   wherein $R_1$ represents an aliphatic or aromatic hydrocarbon radical and n is zero or a small number from zero to eight; or
   if A is (—O—$R_1$—O—$CH_2$—CHOH—$CH_2$—),
   then B denotes (—O—$R_1$—O—) and $R_1$ has the meaning already mentioned, or
   if A represents

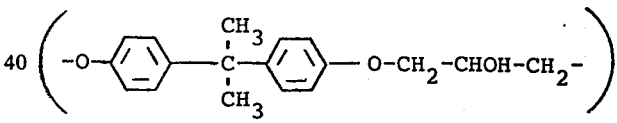

then B is

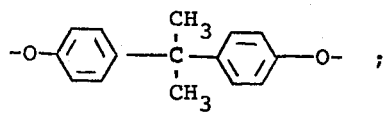

B. consisting of 6 to 16 percent by weight of at least one dicarboxylic acid anhydride with melting point of about 60°–140°C in an amount corresponding to 0.4 – 1.0 anhydride groups per epoxy group (glycidyl group) of the component (A),
   C. a curing accelerator in the form of an organic base and optionally
   D. a flow control agent in an amount of at least 0.05 percent by weight of the mixture, which agent is a polymer of molecular weight ($\overline{M}_n$) of at least 1,000 and has a glass transition temperature which is at least 50°C lower than the glass transition temperature of the component (A), characterized in that the component (C) consists of 0.5 – 1.8 percent by weight of N′,N′-bis-(dimethylaminoisobutylidene)-melamine.

* * * * *